United States Patent
Morishita et al.

(10) Patent No.: US 10,315,775 B2
(45) Date of Patent: Jun. 11, 2019

(54) DUCT STRUCTURE WHICH DISCHARGES AIR THROUGH AIR PRESSURE REGULATING VALVE AND AIRCRAFT

(71) Applicant: Mitsubishi Aircraft Corporation, Aichi (JP)

(72) Inventors: Masatoshi Morishita, Tokyo (JP); Yoichi Uefuji, Tokyo (JP); Toshiyuki Ishida, Tokyo (JP); Gento Ichikawa, Tokyo (JP); Yasunari Tanaka, Aichi (JP); Fumio Kondo, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 110 days.

(21) Appl. No.: 15/052,340

(22) Filed: Feb. 24, 2016

(65) Prior Publication Data
US 2016/0311541 A1 Oct. 27, 2016

(30) Foreign Application Priority Data
Apr. 27, 2015 (JP) .................. 2015-090142

(51) Int. Cl.
*B64D 13/02* (2006.01)
(52) U.S. Cl.
CPC .................. *B64D 13/02* (2013.01)
(58) Field of Classification Search
CPC ...... B60H 1/3442; B64D 13/00; B64D 13/02; B64D 13/06; B64D 2013/003; B64D 2013/0603
USPC ............... 454/76, 248, 292; 137/607.18, 605
See application file for complete search history.

(56) References Cited

U.S. PATENT DOCUMENTS

| 2,952,981 | A | * | 9/1960 | Bartlett, Jr. | ............ | B64D 13/06 62/402 |
| 2008/0219693 | A1 | * | 9/2008 | Kondo | .................. | G03G 21/206 399/92 |
| 2009/0165878 | A1 | * | 7/2009 | Krakowski | ............... | B01F 3/02 137/896 |
| 2010/0210201 | A1 | * | 8/2010 | Dreisilker | .............. | B64D 13/02 454/74 |
| 2012/0015600 | A1 | * | 1/2012 | Larsson | .................... | F24F 1/01 454/254 |
| 2014/0302765 | A1 | * | 10/2014 | Lampe | .................. | B64D 13/06 454/261 |

FOREIGN PATENT DOCUMENTS

JP H04-15198 A 1/1992

* cited by examiner

*Primary Examiner* — Steven B McAllister
*Assistant Examiner* — Ko-Wei Lin
(74) *Attorney, Agent, or Firm* — Pearne & Gordon LLP (57) ABSTRACT

An aircraft duct structure includes a first duct through which exhaust air from a front-side equipment compartment flows, and a second duct through which exhaust air from a rear-side equipment compartment flows. The first duct has a terminal end part where the exhaust air inside the second duct flows into the exhaust air inside the first duct at a substantially right angle, and a flow straightening plate located inside the terminal end part. The terminal end part has a jet opening which faces, across a clearance, an air pressure regulating port where an air pressure regulating valve is disposed. The inside of the terminal end part is divided by the flow straightening plate into an upper region and a lower region. The exhaust air inside the first duct and the exhaust air inside the second duct merge together in the upper region.

17 Claims, 9 Drawing Sheets

--Prior Art--

DUCT STRUCTURE WHICH DISCHARGES AIR THROUGH AIR PRESSURE REGULATING VALVE AND AIRCRAFT

BACKGROUND OF THE INVENTION

Field of the Invention

The present invention relates to a duct structure which discharges air through an air pressure regulating valve mounted in an aircraft and to an aircraft.

Description of the Related Art

Air having been pressurized and temperature-regulated by an air conditioning system is introduced to the inside of an aircraft. The air-conditioned air introduced into the cabin and the cockpit is discharged from there to an underfloor space. A part of the air-conditioned air is supplied as cooling air through a duct into equipment compartments located in a front-side region and a rear-side region of the underfloor space.

Exhaust air discharged from the front-side equipment compartment and exhaust air discharged from the rear-side equipment compartment through a duct merge together in a center part of the underfloor space before being discharged through an air pressure regulating valve (outflow valve) to the outside of the aircraft.

The pressure inside an aircraft in flight is regulated to a predetermined value by adjusting the opening degree of the air pressure regulating valve (e.g., Japanese Patent Laid-Open No. 4-15198).

Figure 9:
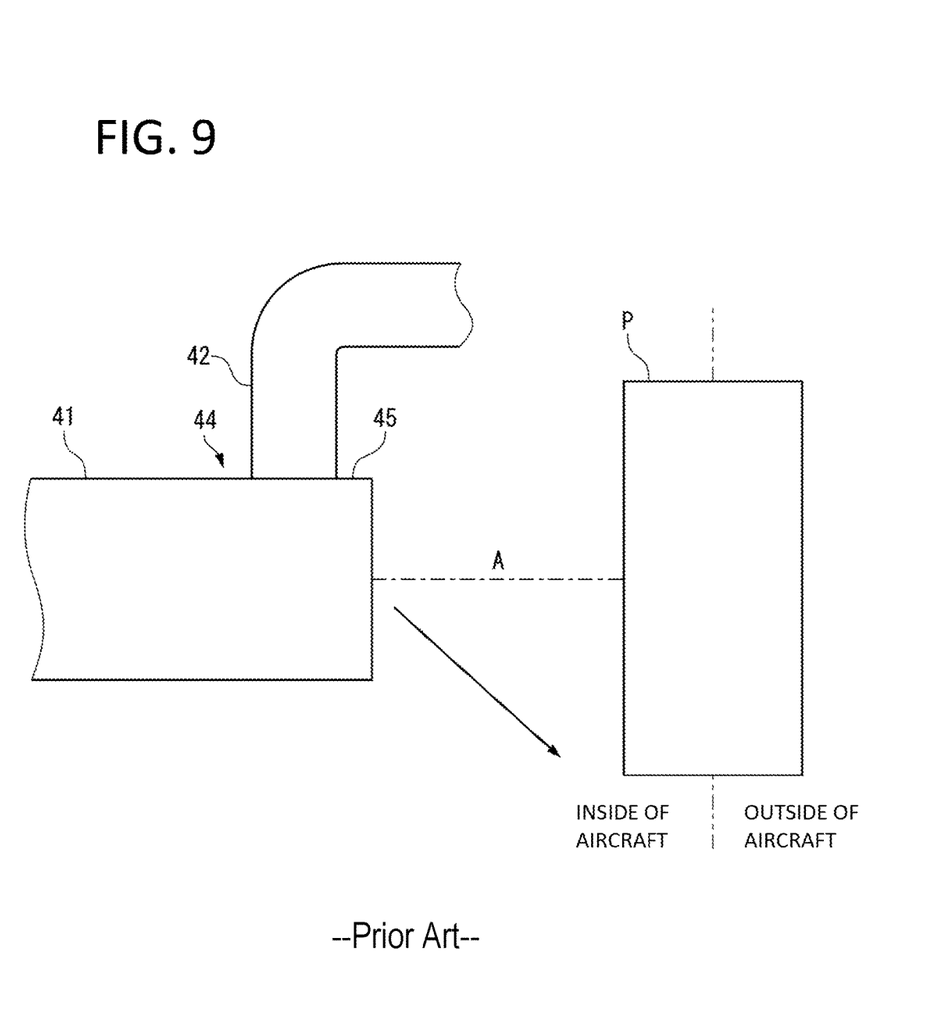
FIG. 9 is a view illustrating a problem to be solved by the present invention.

Due to limitations on the piping space inside the underfloor space, it may be unavoidable that, as shown in FIG. 9, of two ducts 41, 42, which are routed respectively from the front-side and rear-side equipment compartments toward an air pressure regulating port P where the air pressure regulating valve (not shown) is disposed, one duct 42 is connected to the other duct 41 at a right angle near the air pressure regulating port P.

Flows having merged together in a right-angled connection part 44 are jetted out from a duct terminal end 45 to the outside of the duct. Then, the jet flow heads for the air pressure regulating port P and is discharged through the air pressure regulating port P to the outside of the aircraft.

The duct terminal end 45 is located at a distance from the air pressure regulating port P in order to take also air-conditioned exhaust air inside the underfloor space into the air pressure regulating port P and discharge it to the outside of the aircraft.

In the above configuration, the direction of the jet flow jetted out of the duct is affected by the flow inside the duct 42 which is connected at a substantially right angle to the duct 41. If the jet flow deviates from its original flow path A by being pushed down by the flow inside the duct 42 as indicated by the arrow, exhaust air from the ducts 41, 42 fails to be sufficiently discharged through the air pressure regulating port P to the outside of the aircraft. That is, heat is not sufficiently discharged from the equipment compartments.

On the basis of the above-described problem, the present invention aims to provide an aircraft duct structure which allows flows, which merge together in a substantially right-angled duct connection part before being jetted out of the duct, to be sufficiently discharged through an air pressure regulating port to the outside of an aircraft.

SUMMARY OF THE INVENTION

An aircraft duct structure of the present invention includes a first duct through which exhaust air from a first equipment compartment of an aircraft flows, and a second duct through which exhaust air from a second equipment compartment of the aircraft flows.

The first duct has a terminal end part where the exhaust air inside the second duct flows into the exhaust air inside the first duct at a substantially right angle, and a flow straightening member located inside the terminal end part.

The terminal end part has a jet opening which faces, across a clearance, an air pressure regulating port where a valve which regulates the pressure inside the aircraft is disposed.

In the present invention, the inside of the terminal end part is divided by the flow straightening member into a region A and a region B, and the exhaust air inside the first duct and the exhaust air inside the second duct merge together in the region A.

A flow from the second duct is received and deflected by the flow straightening member while merging with a flow from the first duct in the region A of the terminal end part. Then, after passing through the region A, the flow from the second duct merges also with a flow from the first duct which has flowed into the region B of the terminal end part.

Since the flow from the second duct is deflected by the flow straightening member, the flow from the first duct which merges directly with the flow from the second duct is unlikely to be pushed away, so that the jet flow passing by the flow straightening member and jetted out from the jet opening can flow almost straight into the air pressure regulating port.

Therefore, even in the case where it is unavoidable to connect the second duct at a substantially right angle to the first duct due to the narrow piping space, it is possible to avoid an uneven jet flow and sufficiently discharge heat through the air pressure regulating port.

In the aircraft duct structure of the present invention, it is preferable that the axial centers of the jet opening and the air pressure regulating port are located on the same straight line, and that, when the opening diameter of the jet opening is D, the opening diameter of the air pressure regulating port is Dofv, the distance from the jet opening to the air pressure regulating port is x, and the half-value width of the flow velocity of a jet flow flowing out from the jet opening is b½, the following formula holds: Dofv≥D+2b½x.

As will be described later in detail, it is possible to efficiently discharge exhaust air guided by the first and second ducts through the air pressure regulating port by specifying the diameter Dofv of the air pressure regulating port on the basis of the above formula.

In the aircraft duct structure of the present invention, it is preferable that the opening cross-section of the jet opening has a shape relatively long in a direction in which the exhaust air inside the second duct flows into the terminal end part.

Then, the flow velocity is maintained in the region A of the terminal end part, and the flow having flowed in from the second duct flows smoothly while being deflected by the flow straightening member.

In the aircraft duct structure of the present invention, forming a plurality of openings, through which the region A and the region B communicate with each other, in the flow straightening member can reduce pressure loss.

In the aircraft duct structure of the present invention, it is also possible to incline the flow straightening member such that, relative to a downstream-side end of the flow straightening member, an upstream-side end of the flow straightening member is shifted in a direction in which the exhaust air inside the second duct flows into the terminal end part.

An aircraft of the present invention includes the above-described duct structure.

The present invention is especially suitable for small aircraft, such as regional jets, in which securing a sufficient piping space is difficult.

According to the duct structure of the present invention, flows which merge together in a substantially right-angled duct connection part before being jetted out of the duct can be sufficiently discharged through an air pressure regulating port to the outside of an aircraft.

DETAILED DESCRIPTION OF THE PREFERRED EMBODIMENTS

In the following, embodiments according to the present invention will be described with reference to the accompanying drawings.

First Embodiment

Figure 1:
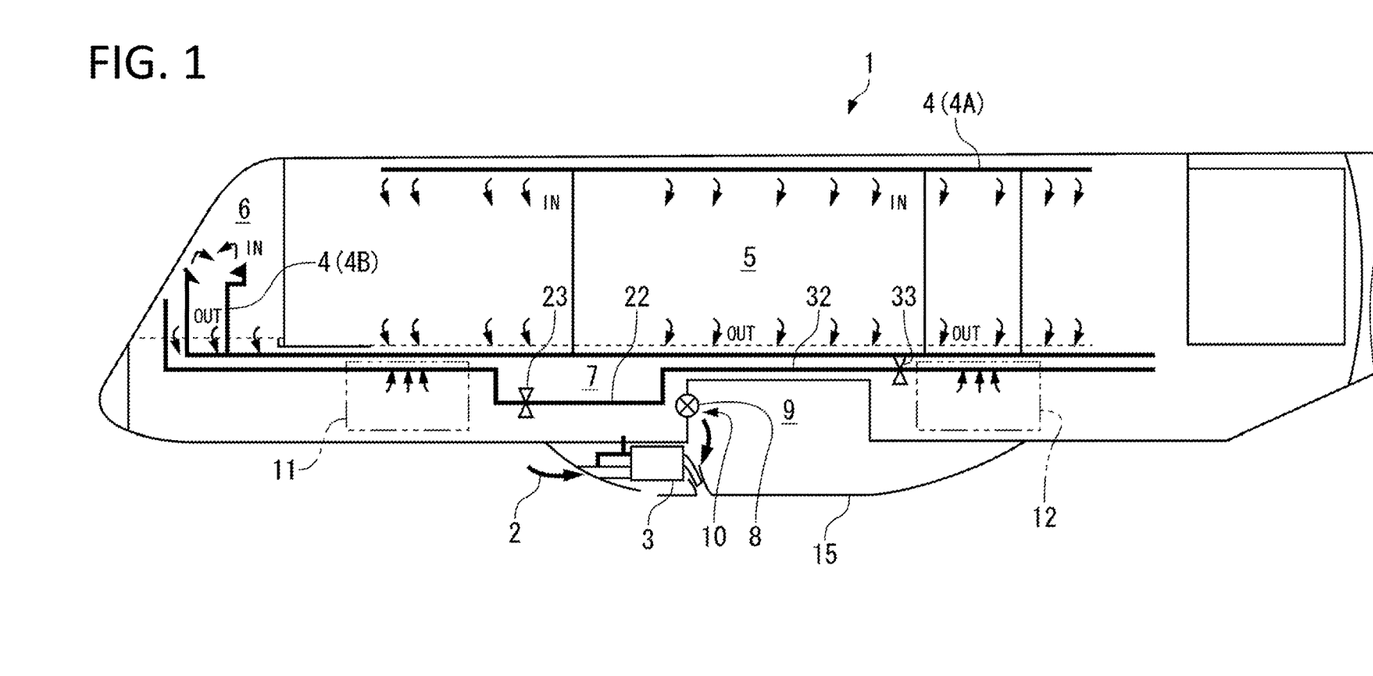
FIG. 1 is a view showing pipelines used for an air conditioning system equipped in an aircraft.

An aircraft 1 shown in FIG. 1 is equipped with an air conditioning system including an air conditioning device 3 which produces air-conditioned air using bleed air 2 from an engine (not shown) as a heat source and a pressure source, and pipelines 4 (4A, 4B) through which the produced air-conditioned air is supplied to sections inside the aircraft.

The air conditioning system controls temperature and pressure by means of the air conditioning device 3 to thereby perform cooling/heating, ventilation, and pressurization of the inside of a cabin 5 and a cockpit 6.

FIG. 1 shows only major lines of the pipelines 4.

The air-conditioned air supplied through the pipeline 4A into the cabin 5 (see the arrows IN) is discharged through a clearance between a floor and a wall etc. into an underfloor space 7 where the pressure is lower than on the inside of the cabin 5 (see the arrows OUT).

A similar description applies for the air-conditioned air supplied through the pipeline 4B into the cockpit 6.

The air conditioning system has a built-in air pressure regulating valve 8 (outflow valve) which regulates the air pressure inside the aircraft. The pressure inside the aircraft is regulated to a predetermined value as the air conditioning device 3 controls the opening degree of the air pressure regulating valve 8. Air-conditioned exhaust air discharged from the inside of the cabin 5 and the cockpit 6 into the underfloor space 7 is discharged through the air pressure regulating valve 8 to the outside of the aircraft.

The air pressure regulating valve 8 is installed inside an air pressure regulating port 10 (FIG. 2 and FIG. 3) provided in a pressure partition wall W (FIG. 2) which defines a fuselage bay 9 where main wings and main landing gears are disposed. The fuselage bay 9 is covered with a fairing 15. The pressure inside the fairing 15 is equivalent to the outside air pressure, and in this specification the inside of the fairing 15 is also referred to as the outside of the aircraft.

Various types of publicly-known valves, such as a butterfly valve and a shutter valve, can be adopted as the air pressure regulating valve 8.

Various pieces of equipment are installed in each of a front-side equipment compartment 11 located in a front-side region of the underfloor space 7 and a rear-side equipment compartment 12 located in a rear-side region of the underfloor space 7.

The equipment compartment means a region (space) inside the underfloor space 7 where various pieces of equipment are disposed. It is not necessary that the equipment compartment is separated from the other regions of the underfloor space 7.

Air discharged from the cabin 5 and the cockpit 6 into the underfloor space 7 (arrows OUT) flows into the front-side equipment compartment 11. Similarly, air discharged from the cabin 5 into the underfloor space 7 flows into the rear-side equipment compartment 12.

An exhaust duct 22 which guides air discharged from the front-side equipment compartment 11 to the air pressure regulating valve 8, a fan 23 used for discharging air, an exhaust duct 32 which guides air discharged from the rear-side equipment compartment 12 to the air pressure regulating valve 8, and a fan 33 used for discharging air are installed in the underfloor space 7.

The exhaust duct 22 sucks out exhaust heat from the pieces of equipment, including a display, fitted in the cockpit 6, and also sucks out exhaust heat in the front-side equipment compartment 11 through which the exhaust duct 22 passes, and sends the exhaust heat to the air pressure regulating valve 8.

Similarly, the exhaust duct 32 sucks out exhaust heat from a lavatory and a galley, and also sucks out exhaust heat in the rear-side equipment compartment 12 through which the exhaust duct 32 passes, and sends the exhaust heat to the air pressure regulating valve 8.

The duct 22 and the duct 32 are routed inside the underfloor space 7, nearly horizontally along the floor. Exhaust air flowing through the duct 22 and exhaust air flowing through the duct 32 merge together in the vicinity of the air pressure regulating port 10 before being discharged through the air pressure regulating valve 8 to the outside of the aircraft.

In this specification, horizontality is defined on the basis of the attitude of the aircraft 1 during parking or cruising.

Figure 2:
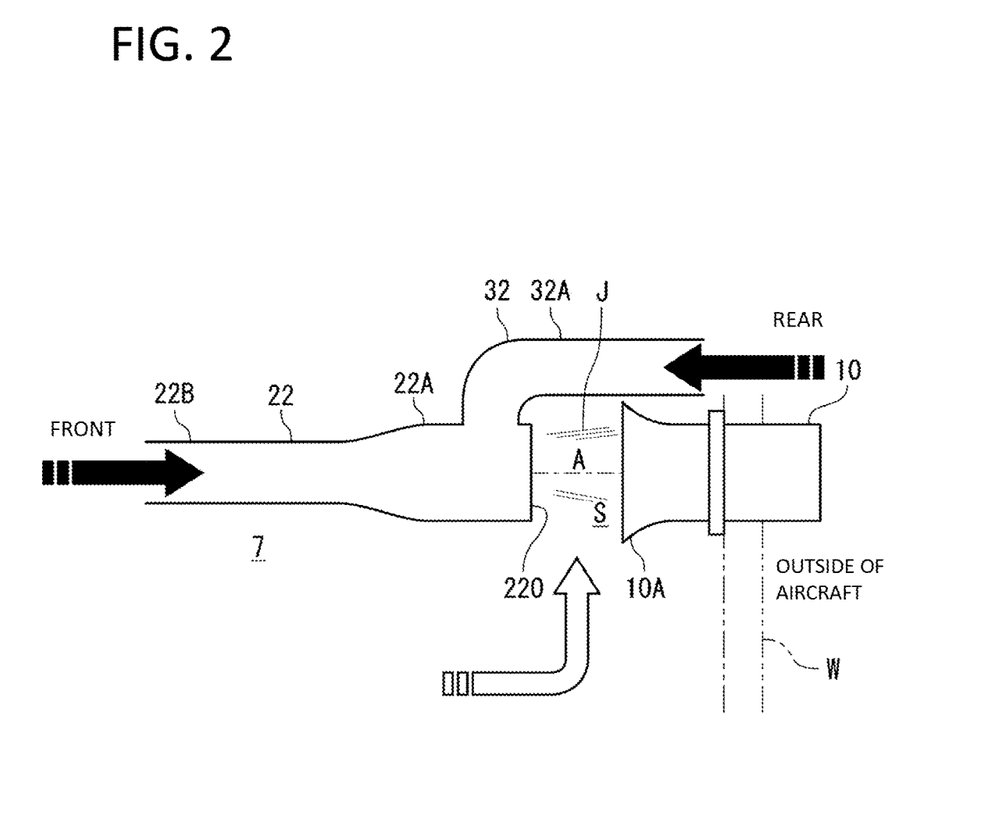
FIG. 2 is a side view showing an exhaust structure around an air pressure regulating port.

An exhaust structure around the air pressure regulating port 10 where the air pressure regulating valve 8 is disposed will be described with reference to FIG. 2.

The air pressure regulating port 10 passes through the pressure partition wall W in the thickness direction (front-rear direction). The air pressure regulating port 10 is composed of a single or a plurality of ducts. An end part 10A of the air pressure regulating port 10 protruding from the pressure partition wall W to the inside of the aircraft has a bell-mouth shape.

The duct 22 extends in the front-rear direction at least in a section near the air pressure regulating port 10, and a terminal end part 22A of the duct 22 is located in front of the air pressure regulating port 10. The axial centers of the opening (jet opening 220) of the terminal end part 22A and the air pressure regulating port 10 are located on the same straight line.

The terminal end part 22A of the duct 22 has a larger diameter than a part 22B on the upstream side therefrom.

The terminal end part 22A is disposed at a distance from the air pressure regulating port 10. As indicated by the outlined arrow in FIG. 2, a part of air-conditioned exhaust air discharged from the inside of the cabin 5 and the cockpit 6 and flowing inside the underfloor space 7 enters the air pressure regulating port 10 through a clearance S between the terminal end part 22A and the air pressure regulating port 10, and is discharged to the outside of the aircraft.

The duct 32 is connected at a right angle to the terminal end part 22A of the duct 22.

The duct 32 is bent downward from a part 32A extending in the front-rear direction, and is connected at a right angle to a side wall of the terminal end part 22A. The inside of the duct and the inside of the duct 32 communicate with each other through a circular opening 25 (FIG. 3) passing through the terminal end part 22A in the plate thickness direction.

In this embodiment, the diameter of the duct 32 is slightly smaller than the diameter of the duct 22, but this is merely an example.

The duct 22 and the duct 32 can be joined together by an appropriate method taking into account their materials as well. In this embodiment, the duct 22 and the duct 32 are both formed of a resin material, and these ducts can be joined together by bonding, welding, etc.

The terminal end part 22A has the jet opening 220 open toward the air pressure regulating port 10.

The exhaust air flowing through the duct 22 and the exhaust air flowing through the duct 32 are jetted out from the jet opening 220 to the clearance S immediately after merging together inside the terminal end part 22A, and head for the air pressure regulating port 10.

When a jet flow J flowing out from the jet opening 220 flows along its original flow path A connecting the axial center of the jet opening 220 and the axial center of the air pressure regulating port 10 with each other, the exhaust air flowing out of the ducts 22, 32 sufficiently enters the air pressure regulating port 10. As a result, the exhaust air containing heat generated from the equipment inside the equipment compartments 11, 12 is sufficiently discharged.

However, the jet flow J flowing out from the jet opening 220 is likely to be affected by the flow flowing from the inside of the duct 32 in a direction orthogonal to the terminal end part 22A. If the jet flow J is affected by the flow inside the duct 32 heading downward for the terminal end part 22A, as indicated by the two-dot chain line in FIG. 3, the jet flow J flows unevenly and deviates from the flow path A by being hit by a crosswind.

To avoid this situation, it is conceivable to route the duct 32 up to the front side of the terminal end part 22A and connect the terminal end part 22A and the duct 32 so as to form a Y-shape, but it is difficult in terms of the allowable piping space inside the underfloor space 7. Moreover, the longer pipe length causes a weight increase.

If the merging point of the ducts 22, 32 is set much further on the front side than the jet opening 220, the direction of a flow is corrected to the direction along the axial line of the duct while flowing inside the duct from the merging point toward the rear side, but, again, it is difficult in terms of the piping space and the weight.

It is also conceivable to shift the air pressure regulating port 10 to the lower side according to the course of an uneven flow of the jet flow J deviating from the flow path A, but the jet flow J does not always deviate from the flow path A. During a control mode of the air conditioning device 3, failure of the fan 33, etc., the flow rate inside the duct 32 may be lower than the flow rate inside the duct 22, or, even when the flow rates inside the ducts 22, 32 are equivalent, the absolute flow rate inside the duct 32 may be lower, and in such cases, the flow inside the duct 32 does not always affect the jet flow J.

To reliably discharge heat from the equipment compartments 11, 12 in such cases including during failure, too, it is desirable to correct the direction of the jet flow J itself without shifting the air pressure regulating port 10 according to the course of the jet flow J deviating from the flow path A.

Figure 3:
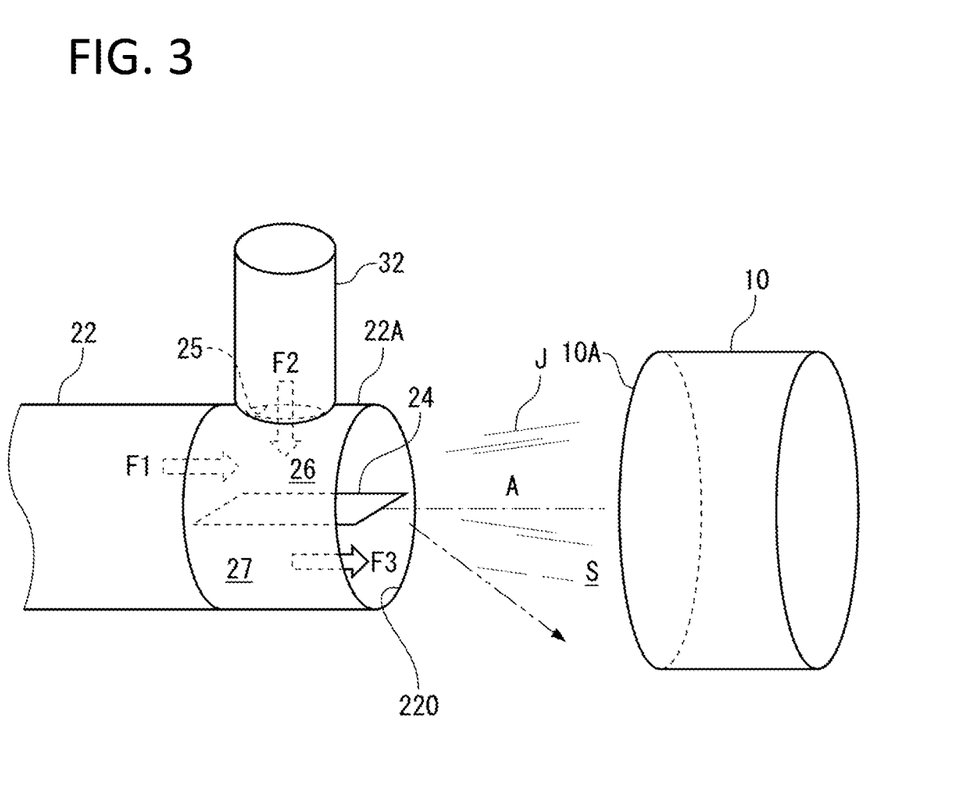
FIG. 3 is a perspective view showing a flow straightening plate installed inside a duct (first embodiment)

In this embodiment, therefore, the inside of the terminal end part 22A is divided by a flow straightening plate 24 into an upper part and a lower part as shown in FIG. 3. The flow straightening plate 24 of this embodiment passes through the axial center of the terminal end part 22A and divides the inside of the terminal end part 22A into two equal parts, but the flow straightening plate 24 may be located on the upper or lower side of the axial center.

The flow straightening plate 24 is disposed horizontally along the axial line of the duct 22. The flow straightening plate 24 extends over an area including a projection region of the opening 25, through which the flow inside the duct 32 flows into the terminal end part 22A, and the area surrounding the projection region.

The flow straightening plate 24 may be formed integrally with the terminal end part 22A by extruding etc., or may be a member separate from the terminal end part 22A.

The flow inside the duct 22 is distributed to an upper region 26 and a lower region 27 of the terminal end part 22A divided by the flow straightening plate 24.

The flow inside the duct 32 flows through the opening 25 into the upper region 26 of the terminal end part 22A.

As indicated by the arrow, a flow F2 from the duct 32 is received and deflected to the horizontal direction by the flow straightening plate 24 while merging with a flow F1 from the duct 22 in the upper region 26 of the terminal end part 22A. Then, after passing through the upper region 26, the flow F2 merges also with a flow F3 from the duct 22 which has flowed into the lower region 27 of the terminal end part 22A.

Since the flow F2 from the duct 32 is deflected by the flow straightening plate 24, the flow F1 from the duct 22 which merges directly with the flow F2 from the duct 32 is unlikely to be pushed downward. Even if the vector of the flow inside the upper region 26 of the terminal end part 22A contains a downward component, the downward component is almost eliminated as the flow merges with the horizontal flow F3 having passed through the lower region 27.

As a result, the jet flow J passing by the flow straightening plate 24 and jetted out from the jet opening 220 shows no influence of the flow F2 from the duct 32, and the jet flow J flows along the flow path A into the air pressure regulating port 10.

Even in the case where, as in this embodiment, it is unavoidable to connect the duct 32 at a right angle to the duct 22 due to the narrow piping space that can be secured inside the underfloor space 7, it is possible to avoid a downward uneven flow of the jet flow J and sufficiently discharge heat through the air pressure regulating port 10 by virtue of the flow straightening effect achieved by the flow straightening plate 24 dividing the inside of the terminal end part 22A where the flows from the duct 22, 32 merge together.

Since the flow straightening plate 24 is provided, the jet flow J is formed in vertical symmetry relative to the flow straightening plate 24. The jet flow J heads for the air pressure regulating port 10 while expanding gradually relative to the opening diameter of the jet opening 220.

The relation between the opening diameter of the jet opening 220 and the opening diameter of the air pressure regulating port 10 will be described below with reference to FIG. 4 and FIG. 5.

Figure 4:
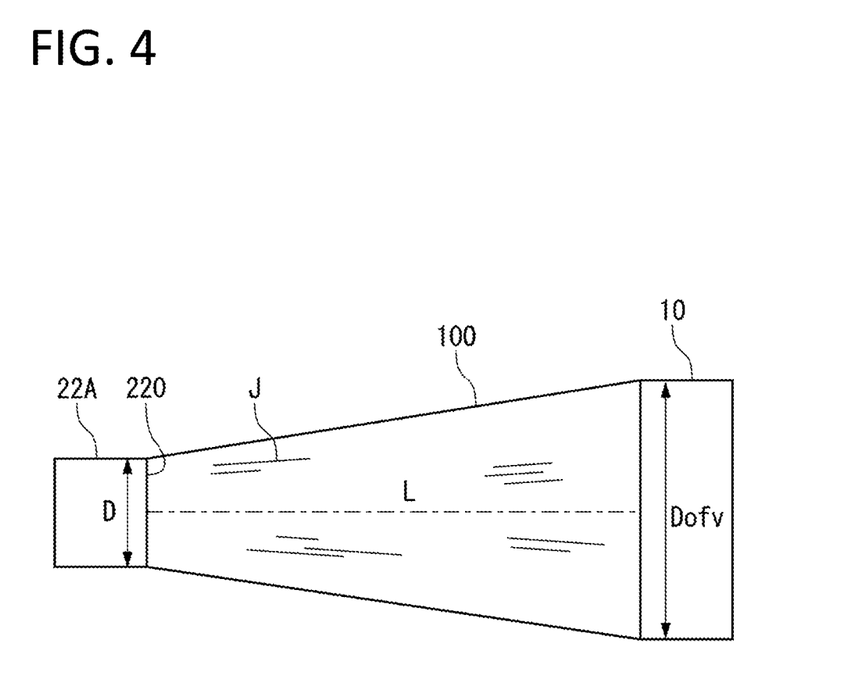
FIG. 4 is a schematic view showing the flow of a jet flow jetted out from the duct.

As shown in FIG. 4, the jet flow J jetted out from the jet opening 220 of the terminal end part 22A expands gradually toward the downstream side while maintaining its vertically symmetrical shape relative to the flow straightening plate 24.

The flow velocity of the jet flow J is highest on a centerline L which coincides with the axial center of the jet opening 220, and the flow velocity is low at an outer edge 100 of the jet flow J away from the centerline L. Although the outer edge 100 actually has an irregular complicated shape, it is schematically represented by the straight lines in FIG. 4. Although the width of the jet flow J changes as indicated by the solid lines in FIG. 5, the width is shown in a simplified manner in FIG. 4.

It is preferable that the expansion and the flow velocity distribution of the jet flow J are taken into account in specifying the relation between a diameter D of the jet opening 220 and a diameter Dofv of the air pressure regulating port 10.

Figure 5:
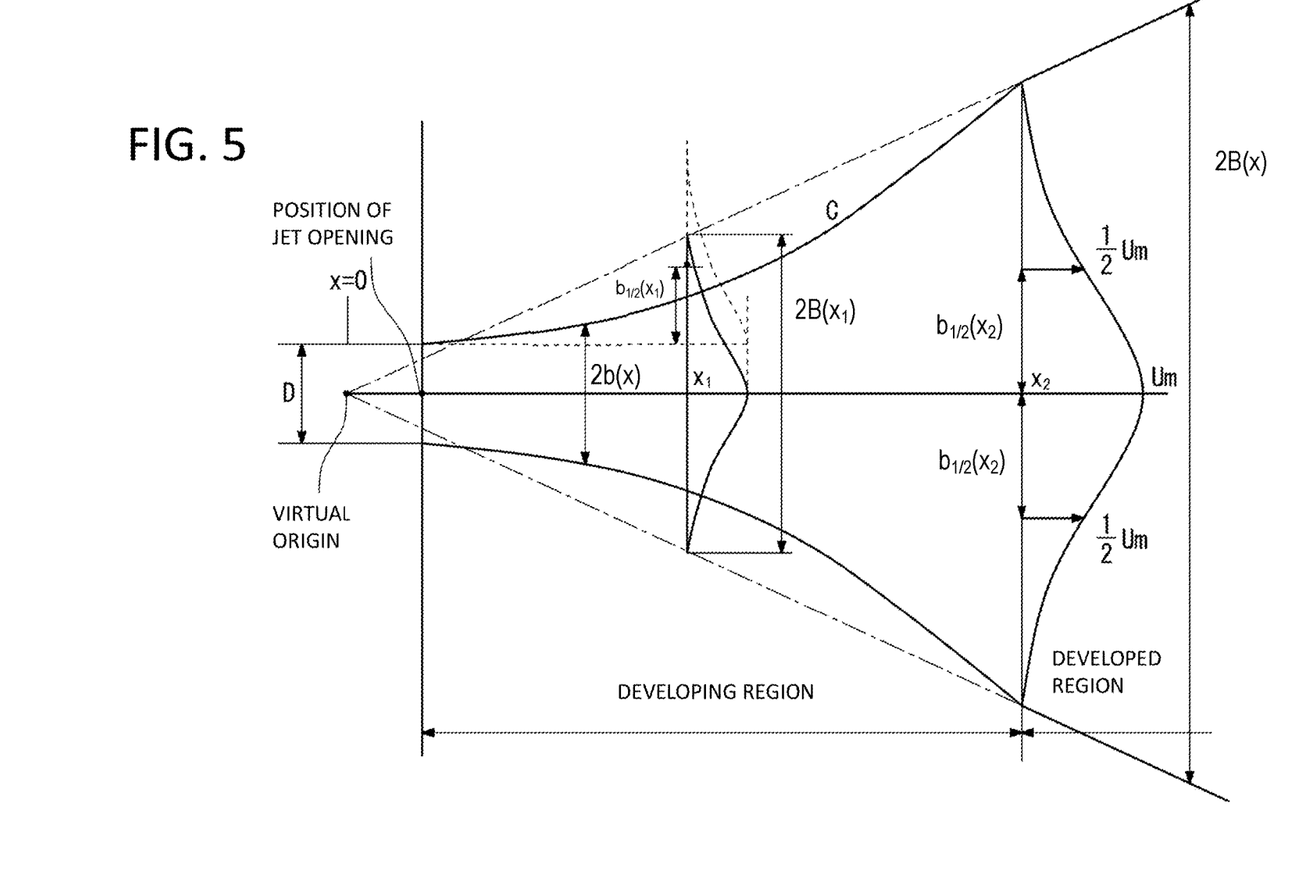
FIG. 5 is a schematic view showing the flow of the jet flow jetted out from the duct.

FIG. 5 shows how a jet flow jetted out from the jet opening 220 flows and the velocity distribution of the jet flow.

Due to its viscosity, the jet flow causes a velocity diffusion layer between a static fluid and the jet flow. The diffusion layer transitions into a state of turbulent flow at some point, and since the diffusion effect of a turbulent flow is larger than the diffusion effect of a laminar flow, the rate of expansion of a jet flow width 2b(x) increases gradually as a function of distance x (developing region). Then, the developing region shifts into a developed region where the velocity distribution has a shape similar to the shape in the developing region relative to the distance from the jet opening 220. In the developed region, a jet flow width 2B(x) expands linearly as a function of distance x. When the straight lines representing the jet flow width 2B(x) in this developed region are extended toward the upstream side as indicated by the dot-and-dash lines, the point at which these extended lines intersect with each other will be referred to as a virtual origin.

The developing region shifts into the developed region at a position on the downstream side at a distance $x_2$, which is about 40 times the diameter D of the jet opening 220, from the virtual origin.

In the developing region, the actually estimated jet flow width 2b(x) is smaller than the width 2B(x) based on the setting of a velocity distribution which has a shape in the developing region similar to the shape in the developed region as shown in FIG. 5.

Accordingly, when specifying the relation between the diameter D of the jet opening 220 and the diameter Dofv of the air pressure regulating port 10, it is possible to set the diameter Dofv of the air pressure regulating port 10 to a size with a margin for the required diameter by applying the concept of using the half-value width $b_{1/2}(x)$ of the flow velocity of the jet flow in the developed region.

The half-value width $b_{1/2}(x)$ is a width corresponding to the flow velocity (½Um) which is half the maximum flow velocity Um, which is a function of distance x.

Figure 6:
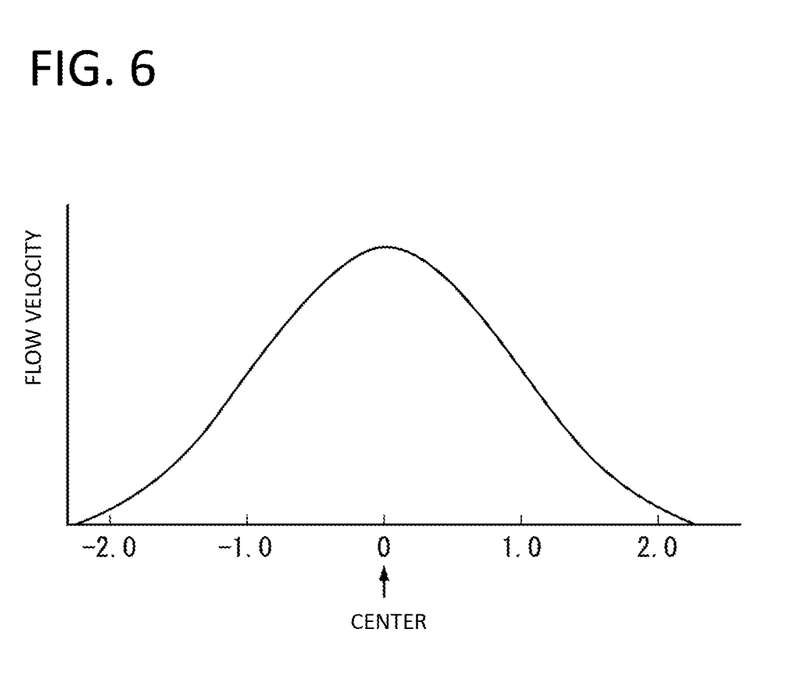
FIG. 6 is a graph showing the velocity distribution of the jet flow.

It can be seen from FIG. 6, which shows the velocity distribution of the jet flow, that the flow velocity is close to zero when the width is about twice as large (2.0) as the half-value width $b_{1/2}(x)$ (1.0).

Here, in the developing region of FIG. 5, the flow velocity distribution, in which the center maximum flow velocity is at an opening circumferential edge of the jet opening 220 as projected along the axial line, is indicated by the dashed lines. A flow velocity equal to or higher than a certain velocity is secured at the half-value width $b_{1/2}(x)$ of this flow velocity distribution. Thus, the diameter Dofv of the air pressure regulating port 10 can be made larger than the diameter D of the jet opening 220 by the amount of the half-value width $b_{1/2}(x)$ while the axial centers of the jet opening 220 and the air pressure regulating port 10 are aligned with each other so that exhaust air from the jet opening 220 can sufficiently flow into the air pressure regulating port 10.

On the basis of the above, in the developing region where the jet flow width 2b(x) is smaller than the width 2B(x) based on the setting of the velocity distribution which has a shape similar to the shape in the developed region, the relation between the diameter Dofv of the air pressure regulating port 10 (the diameter at the end part 10A being an inlet) and the diameter D of the jet opening 220 can be defined as follows:

$$Dofv \geq D + 2b_{1/2}(x) \quad (1)$$

Here, since 0.086x is valid as the half-value width $b_{1/2}(x)$ of a turbulent jet flow in the developed region, the above formula (1) is equivalent to the following formula:

$$Dofv \geq D + 2 \times 0.086 \times x$$

If the diameter Dofv of the air pressure regulating port 10 is set on the basis of the above formula (1), as shown in FIG. 5, an effective diameter relative to the actually estimated jet flow width 2b(x) can be obtained, since the diameter Dofv of the air pressure regulating port 10 is increased relative to the jet flow width in the developing region represented by the curves C ($Dofv \geq D + 2b_{1/2}(x)$).

Thus, exhaust air guided by the ducts 22, 32 can be reliably discharged through the air pressure regulating port 10.

While the distance x in the above formula (1) originates from the virtual origin, for convenience, a distance x originating from the position of the jet opening 220 may be used. In that case, the diameter Dofv of the air pressure regulating port 10 becomes slightly smaller than when the distance x originates from the virtual origin, but it is still possible to allow the exhaust air from the jet opening 220 to sufficiently flow into the air pressure regulating port 10 throughout the range where a flow velocity equal to or higher than a certain velocity is secured. A part of the exhaust air from the jet opening 220 which has deviated from the air pressure regulating port 10 enters the air pressure regulating port 10 again through the clearance S between the terminal end part 22A and the air pressure regulating port 10, as indicated by the outlined arrow in FIG. 2, and is discharged to the outside of the aircraft.

The shapes of the opening cross-sections of the jet opening 220 of the terminal end part 22A and the air pressure regulating port 10 are not limited to an exactly circular shape but may be any shape such as an elliptical or a rectangular shape.

For example, the opening cross-sections of both the jet opening 220 and the air pressure regulating port 10 can have an oval shape (or an oblong or elliptical shape) which is long in the vertical direction. In that case, the diameter Dofv obtained by the above formula can be converted into the diameter of an oval shape having the same cross-sectional area as an exactly circular shape of that diameter. That is, an equivalent diameter can be calculated.

If the volume inside the terminal end part 22A is increased as the opening cross-section has an oval shape, it is possible to secure a sufficient effective opening area in the upper region 26 of the terminal end part 22A and to reduce pressure loss, so that the flow velocity is maintained as well as the flow having flowed in from the duct 32 flows smoothly while being deflected by the flow straightening plate 24.

Second Embodiment

Figure 7:
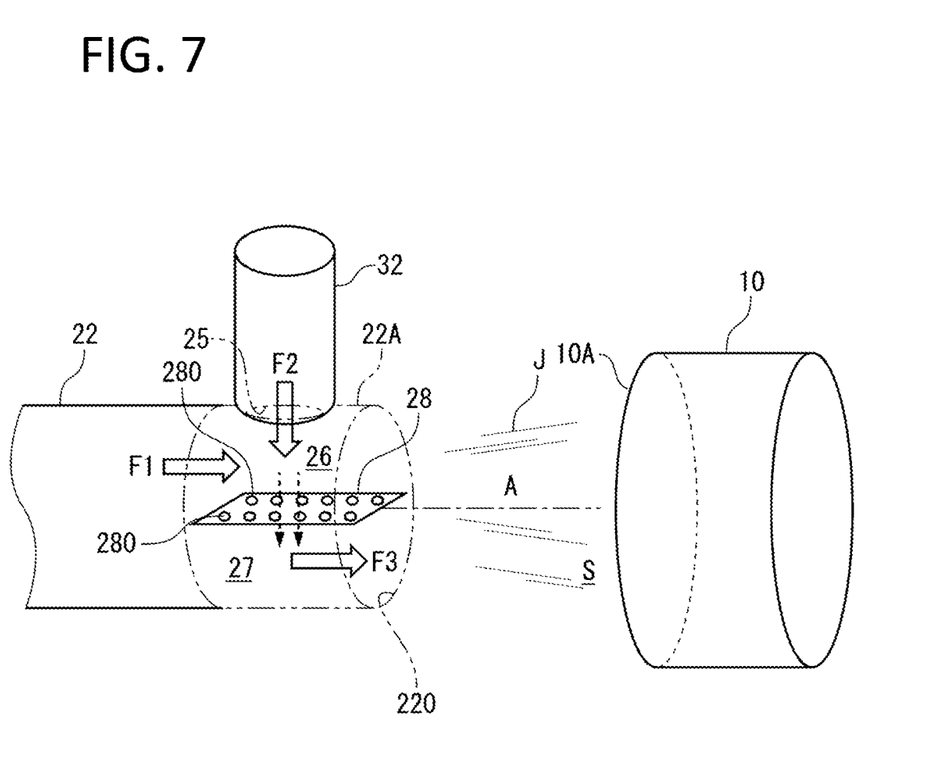
FIG. 7 is a perspective view showing a flow straightening plate installed inside the duct (second embodiment)

In a second embodiment, a flow straightening plate 28 having a plurality of openings 280 formed therein is installed inside the terminal end part 22A. Except that the openings 280 are formed, the flow straightening plate 28 has the same constitution as the flow straightening plate 24 of the first embodiment.

The plurality of openings 280 penetrate the flow straightening plate 28 in the thickness direction.

The flow straightening plate 28 shown in FIG. 7 is formed from a perforated metal material in which circular holes as the openings 280 are punched. Other than a perforated metal material, a plate material having slits as the openings 280 formed therein can also be used. The form of the openings 280 is arbitrary.

The flow straightening plate 28 receives and deflects the flow flowing from the duct 32 into the terminal end part 22A while releasing a part of the flow from the duct 32 and the duct through the openings 280 into the lower region 27 of the terminal end part 22A. Thus, pressure loss during merging of flows in the upper region 26 of the terminal end part 22A can be reduced.

The configurations presented in the above embodiments can otherwise be selectively adopted or appropriately modified into other configurations within the scope of the present invention.

Figure 8:
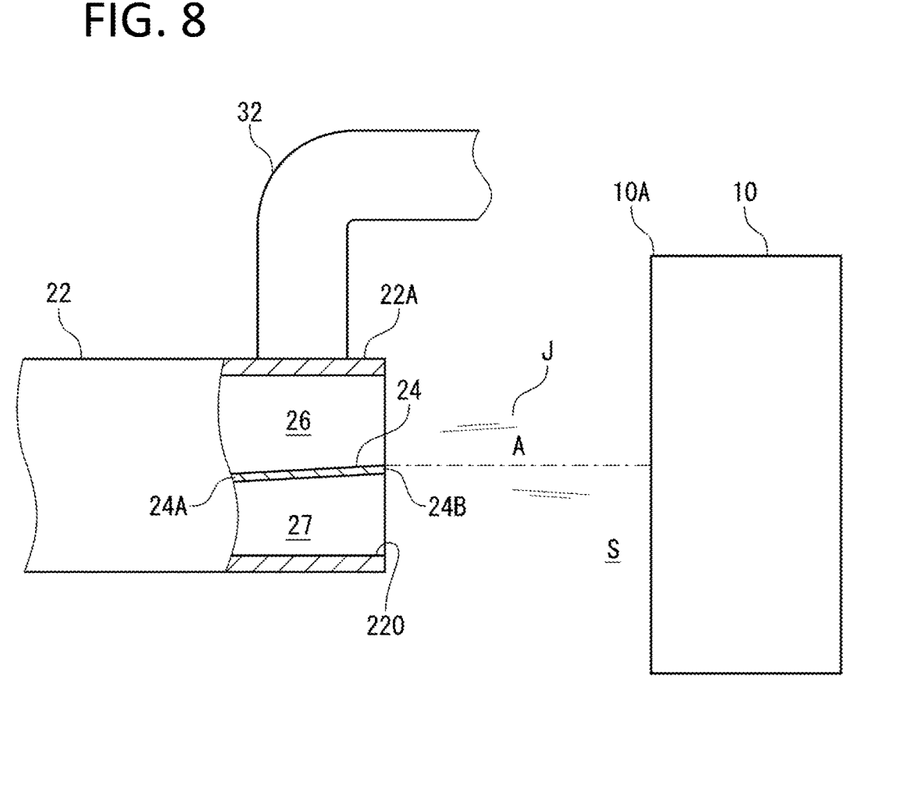
FIG. 8 is a view showing a modified example of the present invention.

To more reliably correct the direction of the jet flow J to the direction along the flow path A, it is also possible, for example, as shown in FIG. 8, to slightly incline the flow straightening plate 24 (or the flow straightening plate 28) such that a front-side end 24A is located on the lower side relative to a rear-side end 24B located on the axial line of the terminal end part 22A.

Then, it is possible to guide the flow inside the terminal end part 22A upward while sufficiently securing the volume of the upper region 26, so that the downward uneven flow of the jet flow J flowing out from the jet opening 220 can be eliminated by the upward component generated in the flow inside the terminal end part 22A.

The duct structure of the present invention can be applied regardless of the directions of the air pressure regulating port 10 and the jet opening 220 of the duct terminal end part 22A. For example, in the case where the air pressure regulating port 10 and the jet opening 220 are open in the vertical direction, too, it is possible to suppress the uneven flow of a flow jetted out of the duct and sufficiently discharge heat by disposing the flow straightening plate 24 or the flow straightening plate 28 inside the duct terminal end part 22A.

What is claimed is:

1. An aircraft duct structure comprising:
a first duct through which exhaust air from a first equipment compartment of an aircraft flows; and
a second duct through which exhaust air from a second equipment compartment of the aircraft flows, wherein
the first duct has a terminal end part where the exhaust air inside the second duct flows into the exhaust air inside the first duct at a substantially right angle, and a flow straightening member located inside the terminal end part,
the terminal end part has a jet opening which faces, across a clearance, an air pressure regulating port where a valve which regulates the pressure inside the aircraft is disposed,
the inside of the terminal end part is divided by the flow straightening member into a region A and a region B,
the exhaust air inside the first duct and the exhaust air inside the second duct merge together in the region A,
axial centers of the jet opening and the air pressure regulating port are located on the same straight line,
an opening diameter of the jet opening is D, an opening diameter of the air pressure regulating port is Dofv, a distance from the jet opening to the air pressure regulating port is x, and a jet flow flowing out from the jet opening has a half-value width of flow velocity in a developed region that is $b_{1/2}(x)$, and $$Dofv \approx D + 2b_{1/2}(x).$$

2. The aircraft duct structure according to claim 1, wherein the opening cross-section of the jet opening has a shape relatively long in a direction in which the exhaust air inside the second duct flows into the terminal end part.

3. The aircraft duct structure according to claim 1, wherein the flow straightening member extends over an area including a projection region of an opening through which the exhaust air inside the second duct flows into the terminal end part, and an area surrounding the projection region.

4. The aircraft duct structure according to claim 1, wherein the inside of the terminal end part is divided by the flow straightening member into the region A as an upper part and the region B as a lower part.

5. The aircraft duct structure according to claim 1, wherein the terminal end part has a larger diameter than a part on the upstream side from the terminal end part.

6. The aircraft duct structure according to claim 1, wherein the flow straightening member has formed therein a plurality of openings through which the region A and the region B communicate with each other.

7. The aircraft duct structure according to claim 1, wherein the flow straightening member is inclined such that, relative to a downstream-side end of the flow straightening member, an upstream-side end of the flow straightening member is shifted in a direction in which the exhaust air inside the second duct flows into the terminal end part.

8. An aircraft comprising the duct structure according to claim 1.

9. The aircraft duct structure according to claim 1, wherein the flow straightening member extends across a projection region through which flow inside the second duct flows into the terminal end part of the first duct.

10. The aircraft duct structure according to claim 1, wherein the flow straightening member is formed integrally with the first duct.

11. The aircraft duct structure according to claim 1, wherein the terminal end part of the first duct has a larger diameter than a part of the first duct upstream of the terminal end part.

12. An aircraft duct structure comprising:
a first duct through which exhaust air from a first equipment compartment of an aircraft flows; and
a second duct through which exhaust air from a second equipment compartment of the aircraft flows, wherein
the first duct has a terminal end part where the exhaust air inside the second duct flows into the exhaust air inside the first duct at a substantially right angle, and a plate located inside the terminal end part, the first duct has a terminal end part where the exhaust air inside the second duct flows into the exhaust air inside the first duct at a substantially right angle, and a plate located inside the terminal end part,
the terminal end part has a jet opening which faces, across a clearance, an air pressure regulating port where a valve which regulates the pressure inside the aircraft is disposed,
the inside of the terminal end part is divided by the plate into a region A and a region B,
the exhaust air inside the first duct and the exhaust air inside the second duct merge together in the region A,
axial centers of the jet opening and the air pressure regulating port are located on the same straight line,
an opening diameter of the jet opening is D, an opening diameter of the air pressure regulating port is Dofv, a distance from the jet opening to the air pressure regulating port is x, and a jet flow flowing out from the jet opening has a half-value width of flow velocity in a developed region that is $b_{1/2}(x)$, and $$Dofv \geq D + 2b_{1/2}(x).$$

13. An aircraft duct structure comprising:
a first duct through which exhaust air from a first equipment compartment of an aircraft flows; and
a second duct through which exhaust air from a second equipment compartment of the aircraft flows, wherein
the first duct has a terminal end part where the exhaust air inside the second duct flows into the exhaust air inside the first duct at a substantially right angle, and a flow straightening member located inside the terminal end part,
the terminal end part has a jet opening which faces, across a clearance, an air pressure regulating port where a valve which regulates the pressure inside the aircraft is disposed,
the inside of the terminal end part is divided by the flow straightening member into a region A and a region B,
the exhaust air inside the first duct and the exhaust air inside the second duct merge together in the region A,
the flow straightening member extends over an area including a projection region of an opening through which the exhaust air inside the second duct flows into the terminal end part, and an area surrounding the projection region, and
the flow straightening member is inclined such that, relative to a downstream-side end of the flow straightening member, an upstream-side end of the flow straightening member is shifted in a direction in which the exhaust air inside the second duct flows into the terminal end part.

14. The aircraft duct structure according to claim 13, wherein:
axial centers of the jet opening and the air pressure regulating port are located on the same straight line,
an opening diameter of the jet opening is D, an opening diameter of the air pressure regulating port is Dofv, a distance from the jet opening to the air pressure regulating port is x, a jet flow flowing out from the jet opening has a half-value width of flow velocity in a developed region that is $b_{1/2}(x)$, and $Dofv \geq D + 2b_{1/2}(x)$.

15. The aircraft duct structure according to claim 13, wherein the inside of the terminal end part is divided by the flow straightening member into the region A as an upper part and the region B as a lower part.

16. The aircraft duct structure according to claim 13, wherein the terminal end part has a larger diameter than a part on the upstream side from the terminal end part.

17. The aircraft duct structure according to claim 13, wherein the flow straightening member has formed therein a plurality of openings through which the region A and the region B communicate with each other.

* * * * *